United States Patent [19]

Franke et al.

[11] Patent Number: 5,041,494
[45] Date of Patent: Aug. 20, 1991

[54] AQUEOUS SOLUTIONS OR DISPERSIONS OF POLYURETHANES, A PROCESS FOR THEIR PREPARATION AND THEIR USE IN COATING COMPOSITIONS

[75] Inventors: Joachim Franke, Cologne; Hanns P. Müller, Bergisch Gladbach, both of Fed. Rep. of Germany

[73] Assignee: Bayer Aktiengesellschaft, Leverkusen, Fed. Rep. of Germany

[21] Appl. No.: 264,300

[22] Filed: Oct. 28, 1988

[30] Foreign Application Priority Data

Nov. 3, 1987 [DE] Fed. Rep. of Germany ....... 3737245

[51] Int. Cl.$^5$ .............................................. C08L 83/04
[52] U.S. Cl. ..................................... 524/588; 524/838; 528/28
[58] Field of Search .................. 524/588, 838; 528/28

[56] References Cited

U.S. PATENT DOCUMENTS

| | | | |
|---|---|---|---|
| 3,941,733 | 3/1976 | Chang | 260/29.2 |
| 3,983,291 | 9/1976 | Chang | 428/290 |
| 4,222,925 | 9/1980 | Bryant et al. | 260/37 N |
| 4,567,228 | 1/1986 | Gaa et al. | 524/588 |

FOREIGN PATENT DOCUMENTS 158893 10/1985 European Pat. Off. .

Primary Examiner—John Kight, III
Assistant Examiner—Dennis R. Daley
Attorney, Agent, or Firm—Joseph C. Gil; Thomas W. Roy

[57] ABSTRACT

The present invention is directed to aqueous solutions or dispersions of cationically modified polyurethanes, characterized in that the dissolved or dispersed polyurethanes (i) contain about 2 to 200 milliequivalents of incorporated ammonium groups per 100 g of solids content, (ii) contain 0 to about 25% by weight of ethylene oxide units within terminal or lateral polyether chains and (iii) contain at least 1.3% by weight, calculated as SiO$_3$ (molecular weight=76), of built-in structural units corresponding to the formula

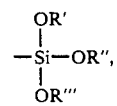

wherein R', R" and R'" may be the same or different and represent hydrogen or alkyl groups containing 1 to 4 carbon atoms, the total quantity of hydrophilic structural units (i) and (ii) being sufficient to ensure the solubility or dispersibility of the polyurethanes in water and the solutions or dispersions having a pH value of 3 to 6. The present invention is also directed to a process for the preparation of these storage stable aqueous solutions or dispersions and to their use as coating compounds or for the preparation of coating compositions for any substrates.

2 Claims, No Drawings

AQUEOUS SOLUTIONS OR DISPERSIONS OF POLYURETHANES, A PROCESS FOR THEIR PREPARATION AND THEIR USE IN COATING COMPOSITIONS

BACKGROUND OF THE INVENTION

1. Field of the Invention

This invention relates to new, storage stable aqueous solutions or dispersions of polyurethanes containing alkoxysilane groups which dry to form cross-linked films, to a process for their preparation and to their use as coating compounds or for the preparation of coating compositions for any substrates.

2. Description of the Prior Art

Polyurethanes containing alkoxysilane groups have already been used in the form of their organic solutions for the preparation of moisture hardening coatings (see e.g. EP-A-158,893 or U.S. Pat. No. 4,222,925). One serious disadvantage of these systems is the use of organic solvents with the attendant disadvantages of environmental pollution, combustibility and odor. Another disadvantage lies in the sensitivity of these solutions to moisture. Even slight traces of water may cause instant cross-linking or gelling which renders the solution unusable.

In spite of the great sensitivity of the alkoxysilane groups to traces of water, there has been no lack of attempts to prepare polyurethanes containing alkoxysilane groups in the form of aqueous solutions or dispersions which can be used as environmentally safer coating compounds. EP-A-163,214, for example, describes aqueous dispersions of polyurethanes containing organosilane groups but it is pointed out in this prior publication that if the "silyl concentration" in the polymer is greater than 0.1% by weight there is a risk of premature gelling which is countered by keeping the pH of the dispersion above 7. Such a low concentration of cross-linkable centers is hardly suitable for ensuring the high cross-link density essential for the production of high quality surface coats and adjustment of the pH to values above 7 as recommended in the prior publication obviously renders the described dispersions unsuitable for the preparation of coatings which harden spontaneously at room temperature.

The disclosure of U.S. Pat. No. 3,983,291 and especially of U.S. Pat. No. 3,941,733 confirms this teaching of the prior art. In U.S. Pat. No. 3,941,733, for example, it is stated that the compounds are at their most stable at pH values of 6.5 to 9 and that curing of the surface structures prepared from the dispersions is preferably carried out under stoving conditions. It is obviously on account of the problems of stability which are recognized by the authors of U.S. Pat. No. 3,941,733 that the proportion of cross-linkable siloxane groups is kept very low in the specific polymers described in the examples. A low proportion of these groups not only results in a low cross-linking density, as already mentioned, but also means that stoving of the coatings is essential if cross-linking is to be achieved to any significant extent with the small amount of cross-linkable groups present.

It was therefore an object of the present invention to provide new solutions or dispersions of polyurethanes containing cross-linkable alkoxysilane groups which would be free from the above-mentioned disadvantages of the systems known in the art. The new solutions and dispersions should in particular be stable in storage and contain a high concentration of cross-linkable alkoxysilane groups so that they may be used for the production of high quality surface structures which will undergo cross-linking at room temperature.

It was surprisingly found that this problem could be solved by providing the solutions or dispersions according to the invention described below and the process for their preparation. Contrary to the teaching in the state of the art cited above, the solutions and dispersions according to the invention combine a high concentration of cross-linkable alkoxysilane groups with very high storage stability at pH values of 3 to 6 and enable high quality coatings to be obtained which will harden at room temperature.

SUMMARY OF THE INVENTION

The present invention is directed to aqueous solutions or dispersions of cationically modified polyurethanes, characterized in that the dissolved or dispersed polyurethanes (i) contain about 2 to 200 milliequivalents of incorporated ammonium groups per 100 g of solids content, (ii) contain 0 to about 25% by weight of ethylene oxide units within terminal or lateral polyether chains and (iii) contain at least 1.3% by weight, calculated as $SiO_3$ (molecular weight=76), of built-in structural units corresponding to the formula

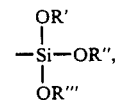

wherein $R'$, $R''$ and $R'''$ may be the same or different and represent hydrogen or alkyl groups containing 1 to 4 carbon atoms, the total quantity of hydrophilic structural units (i) and (ii) being sufficient to ensure the solubility or dispersibility of the polyurethanes in water and the solutions or dispersions having a pH value of 3 to 6.

The present invention is also directed to a process for the preparation of storage stable aqueous solutions or dispersions of cationically modified polyurethanes by the step or prepolymer process wherein the improvement is based on chemically incorporating an organic compound corresponding to the formula

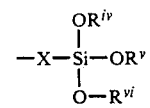

wherein

X represents an organic groups containing at least one isocyanate reactive group and $R^{iv}$, $R^v$ and $R^{vi}$ may be the same or different and represent an alkyl group having 1 to 4 carbon atoms and adding sufficient acid to the solutions or dispersions to obtain a pH value of 3 to 6.

This invention also relates to the use of the solutions or dispersions as coating compounds or for the preparation of coating compositions for any substrates.

DETAILED DESCRIPTION OF THE INVENTION

The process for the preparation of the inventive solutions or dispersions is based on the reaction of (a) organic polyisocyanates with
(b) organic polyhydroxyl compounds in the molecular weight range of 400 to about 6000,
(c) compounds containing tertiary amine nitrogen atoms and at least one isocyanate reactive group,
(d) organic compounds corresponding to the following general formula

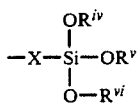

wherein
X represents an organic group carrying at least one isocyanate reactive group and
$R^{iv}$, $R^{v}$ and $R^{vi}$ may be the same or different and represent alkyl groups having 1 to 4 carbon atoms,
(e) optionally compounds which are monofunctional or difunctional in isocyanate addition reactions and contain a hydrophilic polyether chain in which at least 40 mole-% of the chain members are ethylene oxide units and
(f) optionally alcoholic, aminic and/or hydrazinic chain lengthening agents in the molecular weight range of 32 to 399.

The reaction of component (a) with components (b) to (f) may be carried out as a one-shot process, optionally in the presence of an inert, water-miscible solvent, followed by conversion of the polyurethane which is present in solution into an aqueous solution or dispersion. Alternatively an isocyanate prepolymer is first prepared from an excess quantity of component (a) and from components (b), (c), (d) and optionally (e) which may be added in any sequence or as mixtures, optionally in the presence of an inert, water-miscible solvent. The isocyanate prepolymer is subsequently mixed with water optionally containing aminic or hydrazininc chain lengthening agents (f) and converted into an aqueous solution or dispersion with concomitant chain lengthening.

In either process the incorporated tertiary nitrogen atoms are neutralized with an acid at the latest at the stage when the prepolymer is dissolved or dispersed in water. The quantity of acid, which is optionally used in excess, is calculated to result in a solution or dispersion having a pH of 3 to 6. The nature and proportions of the starting components are chosen so that the polyurethanes present as solutions or dispersions contain (i) about 2 to 200 milliequivalents of incorporated ammonium groups per 100 g of solids content,
(ii) 0 to about 25% by weight of ethylene oxide units within lateral or terminal polyether chains and
(iii) at least 1.3% by weight, calculated as $SiO_3$ (molecular weight=76) of incorporated structural units corresponding to the following formula

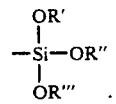

Suitable polyisocyanates (a) include organic compounds containing at least two free isocyanate groups. Diisocyanates of the formula $Q(NCO)_2$ are preferably used wherein Q denotes an aliphatic hydrocarbon groups with 4 to 12 carbon atoms, a cycloaliphatic hydrocarbon group with 6 to 15 carbon atoms, an aromatic hydrocarbon group with 6 to 15 carbon atoms or an araliphatic hydrocarbon group with 7 to 15 carbon atoms.

Examples of preferred diisocyanates include tetramethylene diisocyanate, hexamethylenediisocyanate, dodecamethylenediisocyanate, 1,4-diisocyanatocyclohexane, 1-isocyanato-3,3,5-trimethyl-5-isocyanatomethylcyclohexane, 4,4′-diisocyanato-dicyclohexylmethane, 4,4′-diisocyanato-2,2-dicyclohexylpropane, 1,4-diisocyanatobenzene, 2,4-diisocyanatotoluene, 2,6-diisocyanatotoluene, 4,4′-diisocyanatodiphenylmehtane, m- and p-xylylenediisocyanate, $\alpha,\alpha,\alpha'$,$\alpha'$-tetramethyl-m- and p-xylylenediisocyanate and mixtures of these compounds.

Known higher functional polyisocyanates and the known modified polyisocyanates containing, for example, carbodiimide groups, allophanate groups, isocyanurate groups, urethane groups and/or biuret groups may, of course, also be included in limited amounts.

Suitable starting materials (b) for the process according to the invention include polyether, polyester, polyetherester, polycarbonate and polyacrylate polyols in the molecular weight range of 400 to about 6000, preferably about 500 to 3000. Mixtures of such polyhydroxyl compounds may also be used. Examples of suitable polyols are found in U.S. Pat. No. 4,305,858, herein incorporated by reference. Polyether polyols or polyester polyols in the above-mentioned molecular weight range containing (on statistical average) 2 to 3, preferably 2, alcoholic hydroxyl groups are preferably used as component (b). The preparation of these starting materials is known in the art and has been described, for example, in Kunststoff-Handbuch, Volume VII, "Polyurethane", Carl Hanser Verlag, Munich (1966), pages 45 et seq.

Starting components (c) include hydroxy-functional and/or aminofunctional, monofunctional and especially bifunctional compounds in the molecular weight range of 88 to about 1000, preferably 89 to about 300 which contain tertiary amine nitrogen atoms. The nitrogen atoms may be converted at least partly into tertiary or quaternary ammonium groups by neutralization or quaternization during or after termination of the isocyanate polyaddition reaction. Examples include 2-(N,N-dimethylamino)-ethylamine, N-methyl-diethanolamine, N-methyl-diisopropanolamine, N-ethyl-diethanolamine, N-ethyl-diisopropanolamine, N,N′-bis-(2-hydroxyethyl)-perhydropyrazine, N-methyl-bis-(3-aminopropyl)-amine, N-methyl-bis-(2-aminoethyl)-amine, N,N′,N″-trimethyl-diethylenetriamine, N,N-dimethyl-aminoethanol, N,N-diethyl-aminoethanol, 1-(N,N-diethylamino)-2-aminoethane and 1-(N,N-diethylamino)-3-aminopropane.

The starting components d) to be used according to the invention include compounds corresponding to the formula

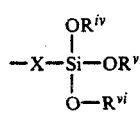

in which
R$^{iv}$, R$^v$, and R$^{vi}$ may be the same or different and represent alkyl groups having 1 to 4 carbon atoms, preferably methyl or ethyl groups and
X represents an organic group containing at least one isocyanate reactive group, preferably a hydroxyl or primary amino group, as substituent.

Particularly suitable compounds (d) of this type include those corresponding to the formula wherein R$^{iv}$, R$^v$ and R$^{vi}$ represent methyl or ethyl groups and X represents 2-hydroxyethyl, 3-hydroxypropyl, 2-(2-hydroxy)-ethyl, 2-(2-aminoethylamino)-ethyl or 3-(3-aminopropylamino)-propyl group.

The following are examples of preferred suitable starting materials (d): $H_2N-(CH_2)_3-Si(O-CH_2-CH_3)_3$, $HO-CH(CH_3)-CH_2-Si(OCH_3)_3$, $HO-(CH_2)_3-Si(OCH_3)_3$, $HO-CH_2-CH_2-O-CH_2-CH_2-Si(OCH_3)_3$, $(HO-C_2H_5)_2-N-(CH_2)_3-Si(OCH_3)_3$, $HO-(C_2-H_4-O)_3-C_2H_4-N(CH_3)-(CH_2)_3-Si(O-C_4H_9)_3$, $H_2N-CH_2-C_6H_4-CH_2-CH_2-Si(OCH_3)_3$, $HS-(CH_2)_3-Si(OCH_3)_3$, $H_2N-(CH_2)_3-NH-(CH_2)_3-Si(OCH_3)_3$, $H_2N-CH_2-CH_2-NH-(CH_2)_2-Si(OCH_3)_3$, $H_2N-(CH_2)_2-NH-(CH_2)_3-Si(OCH_3)_3$.

Optional starting material (e) include organic compounds in the molecular weight range of about 800 to 10,000, preferably about 1000 to 5000, which contain one or two hydroxyl groups and a polyether chain. The polyether chain is a lateral chain in the case of divalent polyether alcohols. The polyether chains in these compounds are based on at least 40 mole-%, preferably at least 65 mole-% of ethylene oxide units, the remainder being other alkylene oxide units, preferably propylene oxide units.

Examples of suitable starting components (e) include the hydrophilic starting components containing polyether chains and hydroxyl groups disclosed in U.S. Pat. No. 4,237,264, U.S. Pat. No. 4,092,286 and U.S. Pat. No. 4,190,566, the disclosures of which are herein incorporated by reference.

The optional starting components (e) are preferably monohydric polyether alcohols in the abovementioned molecular weight range which may be obtained by the alkoxylation of monovalent starting molecules such as methanol, ethanol or preferably n-butanol with ethylene oxide or mixtures of ethylene oxide and preferably propylene oxide as alkoxylating agents.

Optional starting components f) include organic, preferably divalent and/or trivalent, more preferably divalent polyhydroxyl compounds in the molecular weight range of 62 to 399, preferably from 62 to about 250, or aminic or hydrazinic chain lengthening agents or cross-linking agents in the molecular weight range of 32 to 399, preferably 60 to about 250.

Examples of polyhydroxyl compounds include monohydric alcohols such as ethylene glycol, propylene glycol, propane-1,3-diol, butane-1,4-diol, hexane-1,6-diol, trimethylolpropane and glycerol. Low molecular weight polyester diols such as the bis-(hydroxyethyl)ester of adipic acid or low molecular weight diols containing ether groups such as diethylene glycol, triethylene glycol, tetraethylene glycol, dipropylene glycol, tripropylene glycol or tetrapropylene glycol may also be used as starting component e).

Compounds containing reactive NH groups include ethylenediamine, hexamethylenediamine, piperazine, 2,5-dimethylpiperazine, 1-amino-3-aminomethyl-3,5,5-trimethyl-cyclohexane (isophorone diamine, IPDA), 4,4'-diamino-dicyclohexylmethane, 1,4-diamino-cyclohexane, 1,2-diamino-propane, hydrazine, hydrazine hydrate, amino-acidhydrazides such as 2-aminoacetic acid hydrazide and bis-hydrazides such as succinic acid-bis-hydrazide.

The aminic and hydrazinic chain lengthening agents in particular, which contain no tertiary nitrogen atoms, may also be used in blocked form in the process according to the invention, i.e. in the form of the corresponding ketimines (DE-AS 2,725,589), ketazines (DE-OS 2,811,148, U.S. Pat. No. 4,269,748) or amine salts (U.S. Pat. No. 4,292,226). Oxazolidines of the type used, for example, in DE-OS 2,732,131 or U.S. Pat. No. 4,192,937 are also masked diamines which may be used for chain lengthening the isocyanate prepolymers. When such masked diamines are used, they are generally mixed with the isocyanate prepolymers in the absence of water and the mixture obtained is subsequently mixed with the water of dispersion or with part of the water of dispersion so that the corresponding diamines are released as intermediate products by hydrolysis.

Further examples of compounds to be used as starting components f) in the process according to the invention are described, for example, in High Polymers, Vol. XVI, "Polyurethanes, Chemistry and Technology", by Saunders-Frisch, Interscience publishers, New York, London, Volume I, 1962, pages 32 and 42 and pages 44 to 54 and Volume II, 1964, pages 5 to 6 and 198 to 199 and in Kunststoff-Handbuch, Volume VII, Vieweg-Höchtlen, Carl-Hanser-Verlag, Munich 1966, e.g. on pages 45 to 71.

Isocyanate reactive compounds which are trifunctional or higher functional in isocyanate polyaddition reactions may be included in small amounts to produce a certain degree of branching as discussed with the previously mentioned trifunctional or higher functional polyisocyanates. Monohydric alcohols, e.g. n-butanol, n-dodecanol or stearyl alcohol, may also be used in small quantities.

In the process according to the invention, the ammonium groups are incorporated by means of starting components (c) containing tertiary amino groups, the tertiary amino groups being converted into the corresponding ammonium groups by neutralization with inorganic or organic acids such as hydrochloric acid, acetic acid, fumaric acid, maleic acid, lactic acid, tartaric acid, oxalic acid or phosphoric acid.

The quantity of starting component (c) and the quantity of acid used for neutralization are calculated so that the polyurethanes contain about 2 to 200 milliequivalents, preferably about 2 to 100 and most preferably about 5 to 50 milliequivalents of ammonium groups per 100 g of solids content and the solutions or dispersions have a pH of 3 to 6. This means that the acid is frequently used in excess, based on the tertiary nitrogen atoms in component (c), especially when weak acids are used.

In addition to the ammonium groups, the polyurethanes may contain hydrophilic polyether segments. The quantity of such polyether chains incorporated in lateral or terminal positions corresponds to a quantity of ethylene oxide units incorporated in the polyether chains of the polyurethanes of up to about 25% by weight, preferably up to about 10% by weight, based on the total weight of the polyurethane. In any case, the total quantity of ammonium groups and hydrophilic polyether chains must be selected to ensure that the polyurethanes will be soluble or dispersible in water. Preferably, starting components (e) are not used and the necessary hydrophilic character is ensured by the incorporation of ammonium groups.

The starting components (d) are used in such a quantity in the process according to the invention that the resulting polyurethanes contain at least 1.3% by weight, preferably 1.3 to about 8% by weight (calculated as $SiO_3$, molecular weight=76) of $SiO_3$ units incorporated in the form of structural units corresponding to the formula

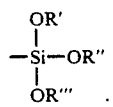

These incorporated structural units correspond, of course, to the starting component (d) although the possibility of partial hydrolysis of the alkoxysilane groups by the water used as solvent or dispersing agent with the formation of hydroxysilane groups cannot be excluded.

The optional starting component (f) for the process according to the invention are used, if at all, in quantities of up to about 10% by weight, preferably up to about 5% by weight, based on the weight of component b).

In the process according to the invention, it is preferable first to prepare a prepolymer containing free isocyanate groups from starting components (a) and (b) in the presence of an inert solvent (such as acetone or N-methylpyrrolidone) or in the absence of solvent. Components (c) and optionally (e) may also be added at this stage or after prepolymer formation. These components are reacted together in such proportions that an NCO/OH equivalent ratio of about 1.2:1 to 2.5:1, preferably about 1.2:1 to 2:1 is maintained. The reaction temperature employed is generally about 5 to 160° C., preferably about 50° to 100° C.

The isocyanate prepolymer obtained is then converted into the high molecular weight products by a reaction with component (d), optionally (c) and/or optionally (f).

The components are used in quantities corresponding to an equivalent ratio of isocyanate groups in the prepolymer to isocyanate reactive groups in components (d), (c) and (f) of about 0.8:1 to 2.5:1, preferably about 0.8:1 to 2:1. The chain lengthening reaction (reaction with component f)) may be carried out by any of several different variations. For example, the isocyanate prepolymer may be reacted with component (d) and at the same time with component (f) in an inert solvent such as acetone or N-methylpyrrolidone. The resulting organic solution may then by mixed with water and the solvent may subsequently be removed by distillation. In another variation, the isocyanate prepolymer may first be reacted with a sub-equivalent quantity of component (d), based on the quantity of isocyanate groups, in a solvent of the type mentioned above to form an isocyanate prepolymer containing alkoxysilane groups and this prepolymer may then be mixed with blocked chain lengthening agents of the type mentioned above and this mixture may then be dispersed in water. In the first mentioned variation, introduction of the ammonium groups may be carried out, for example, by neutralization of the tertiary amino groups before the addition of water or by using an aqueous solution of the acid as neutralizing agent. According to the second variation, for example, the acid required for neutralizing the tertiary amino groups may be added to the water of dispersion. Another variation of the process according to the invention consists of a single stage reaction of components (a), (b), (c) and (d) and optionally (e) and (f) in an organic solvent of the type mentioned above at about 20° to 80° C. and conversion of the dissolved polyurethane into an aqueous dispersion, preferably using aqueous solutions of the required acid, optionally followed by distillative removal of the solvent.

The reaction of the isocyanate prepolymers with components (d) and optionally (c) or (f) and the dispersion of the prepolymer in water are generally carried out within the temperature range of about 20° to 100° C., preferably about 20° to 80° C. The quantity of water is generally calculated to result in about 10 to 60% by weight, preferably about 20 to 50% by weight solutions or dispersions of the polyurethanes.

The procedure for preparing the solutions or dispersions according to the invention is not limited to the process according to the invention, which is merely a preferred method of obtaining the products according to the invention. The tertiary amino groups present in the isocyanate prepolymers, for example, could equally be first at least partially converted into ammonium groups by quaternization, and instead of using starting component (c) containing tertiary amine nitrogen atoms, starting components already containing ammonium groups could be used for the preparation of the isocyanate prepolymers. The end products will again be polyurethanes conforming to the particulars given above concerning the ammonium groups content. The term "ammonium groups" therefore stands both for tertiary ammonium groups obtained by the neutralization of the tertiary amine with an acid and for quaternary ammonium groups obtained by alkylation of a tertiary amino group.

The aqueous solutions or dispersions according to the invention could in principle also be prepared by procedures analogous to the so-called melt dispersion process of U.S. Pat. No. 3,756,922 or the method according to DE-OS 2,543,091.

The solutions or dispersions of polyisocyanate polyaddition compounds according to the invention may be directly used as such for coating any organic or inorganic substrates. The dispersions may be applied to the substrate either directly or after dilution. As the lacquers dry, the alkoxysilane and hydroxysilane groups cross-link by known reactions:

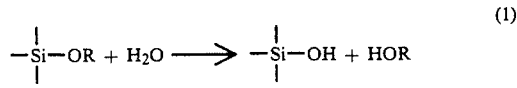

-continued

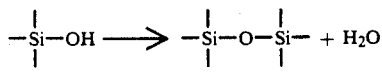
(2)

to form siloxane groups. As already mentioned above, the reaction according to equation (1) at least partly takes place in the solution or dispersion according to the invention. However, the storage stability of the solutions and dispersions according to the invention is evidently due to the fact that reaction (2) which leads to cross-linking does not take place or only to an insignificant extent in the presence of the excess water.

The cross-linking reaction generally proceeds sufficiently rapidly at room temperature, i.e. within a period of less than 24 hours. Drying and cross-linking of the films may be accelerated by stoving the applied films at an elevated temperature, i.e. in the range of about 25° to 150° C., preferably about 80° to 130° C.

The coatings obtained are hard, elastic, extremely solvent resistant and may be either clear or matte, depending on the starting materials used.

The substrates for the PUR dispersion according to the invention may be any organic or inorganic materials, e.g. glass (including glasses and glass panels, glass fibers and glass bottles), wood and wood-like products, metals, plastics, leather, paper, building materials, stone and rock.

Another advantage is that the dispersions according to the invention can be deposited on metallic substrate by cataphoresis.

The usual auxiliary agents and additives known from lacquer technology may, of course, be added when the products are used according to the invention. Auxiliary agents and additives such as pigments, viscosity regulating substances, anti-foamants, UV absorbents, anti-oxidants and other substances which prevent polymer degradation (such as sterically hindered amines), etc. may also be used.

Application of the lacquers is carried out by the conventional methods of lacquer technology such as spraying, casting, immersion or roller coating. The lacquers are generally applied in quantities resulting in dry film thicknesses of about 0.005 to 0.10 mm.

In the following examples, all percentages are percentages by weight.

EXAMPLES

General method for the preparation of the cationic PUR dispersions (a) Preparation of the prepolymer The relatively high molecular weight polyhydroxyl compound (b) and optionally the hydrophilic polyether component (e) were introduced into a dry three-necked flask and dehydrated under a vacuum at 120° C. for one hour. The polyisocyanate component (a) was then introduced under nitrogen into the melt which had cooled to 80° C.

The mixture was stirred at 80° C. until the isocyanate content determined by titration had decreased to the theoretically calculated isocyanate content.

The mixture was then diluted to a solids concentration of about 50% with anhydrous acetone and stabilized with benzoyl chloride added in a quantity of 0.5%, based on the polymer.

(b) Chain lengthening and dispersion

The organosilanes (d) and the compounds (c) containing cationic or potential cationic groups were introduced into the reaction vessel as an approximately 20 to 50% solution in acetone and the prepolymer described under (a) was added dropwise at a temperature <40° C.

The mixture was then stirred at room temperature or at an elevated temperature of up to about 70° C. until no more isocyanate could be detected by IR spectrometry. The mixture was then neutralized with acid and the dispersing water was added. The acetone was removed in a water jet vacuum.

A stable, finely divided aqueous dispersion which was stable in storage under these conditions was obtained.

TABLE

| Example | Isocyanate (a) | Macrodiol (b) | [g] | Compound (c) with dispersing action | [g] | Organosilane (d) | [g] | Polyether (e) [g] | Acid | [g] | Water [g] | Concentration [%] | SiO3 content [%] | pH |
|---|---|---|---|---|---|---|---|---|---|---|---|---|---|---|
| 1 | 1 | 444 | 1 | 1700 | 1 | 72.5 | 1 | 221 | — | 1 | 90 | 7630 | 24 | 3.12 | 3.25 |
| 2 | 1 | 444 | 1 | 1700 | 1 | 108.8 | 1 | 110.5 | — | 1 | 300 | 5777 | 28 | 1.61 | 3.80 |
| 3 | 1 | 555 | 1 | 1700 | 1 | 145 | 1 | 221 | — | 1 | 300 | 8475 | 23 | 2.90 | 4.00 |
| 4 | 1 | 444 | 1 | 1700 | 1 | 72.5 | 2 | 222 | — | 1 | 300 | 6405 | 29 | 3.12 | 4.07 |
| 5 | 1 | 444 | 1 | 1700 | 1 | 72.5 | 2 | 111 | — | 1 | 300 | 5685 | 28 | 1.63 | 3.67 |
| 6 | 1 | 444 | 2 | 2250 | 1 | 72.5 | 1 | 221 | — | 1 | 300 | 6050 | 32 | 2.54 | 3.80 |
| 7 | 1 | 444 | 2 | 2250 | 1 | 108.8 | 1 | 110.5 | — | 1 | 300 | 4879 | 36 | 1.30 | 4.00 |
| 8 | 1 | 444 | 2 | 2250 | 1 | 72.5 | 2 | 222 | — | 1 | 300 | 10295 | 22 | 2.54 | 4.60 |
| 9 | 1 | 444 | 2 | 2250 | 2 | 89.2 | 1 | 110.5 | — | 1 | 300 | 6140 | 31 | 1.31 | 3.64 |
| 10 | 2 | 500 | 2 | 2250 | 1 | 116 | 1 | 144 | 200 | 1 | 200 | 3141 | 49 | 1.54 | 3.75 |
| 11 | 2 | 500 | 2 | 2250 | 2 | 95.2 | 1 | 144 | 200 | 1 | 300 | 2833 | 50 | 1.66 | 3.78 |
| 12 | 1 | 331 | 3 | 432 | 1 | 72.5 | 1 | 221 | — | 1 | 333 | 4480 | 18 | 7.19 | 3.47 |
| 13 | 1 | 369 | 3 | 511 | 1 | 72.5 | 1 | 221 | — | 1 | 300 | 4700 | 19 | 6.47 | 3.77 |
| 14 | 1 | 369 | 3 | 511 | 1 | 72.5 | 1 | 221 | 100 | 1 | 100 | 2164 | 36 | 5.97 | 3.70 |
| 15 | 1 | 369 | 3 | 511 | 1 | 72.5 | 1 | 159 | 100 | 1 | 100 | 2810 | 30 | 4.38 | 4.48 |
| 16* | 1 | 369 | 3 | 511 | 1 | 72.5 | 1 | 221 | — | 2 | 210 | 4485 | 20 | 6.47 | 1.1 |
| 17* | 1 | 369 | 3 | 511 | 1 | 72.5 | 1 | 221 | — | 1 | 30 | 4385 | 21 | 6.47 | 7.1 |
| 18* | 1 | 369 | 3 | 511 | 1 | 72.5 | 1 | 221 | — | 1 | 25 | 4670 | 20 | 6.47 | 7.5 |
| 19 | 1 | 369 | 3 | 511 | 1 | 72.5 | 1 | 221 | — | 3 | 450 | 4895 | 18 | 6.47 | 3.00 |
| 20* | 1 | 369 | 3 | 511 | 1 | 72.5 | 1 | 221 | — | 4 | 100 | 4903 | 19 | 6.47 | 1.5 |
| 21* | 1 | 444 | 1 | 1700 | 4 | 95 | 1 | 221 | — | — | — | 9840 | 20 | 3.09 | 10.8 |
| 22* | 1 | 444 | 1 | 1700 | 5 | 67 | 1 | 221 | — | — | — | 9150 | 21 | 3.13 | 8.9 |

*Comparison Examples

DESCRIPTION OF THE POLYISOCYANATE (A)

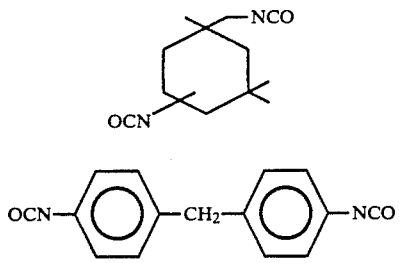

No. 1

No. 2

DESCRIPTION OF THE POLYHYDROXYL COMPOUNDS (B)

No. 1: Polyester of adipic acid, hexanediol and neopentyl glycol (molar ratio of diols 65:35) OH number = 64–68

No. 2: Polyester of adipic acid and butanediol OH number = 48–52

No. 3: Polyacrylate, OH number 140–150

DESCRIPTION OF THE (POTENTIAL) IONIC STARTING COMPONENT (C)

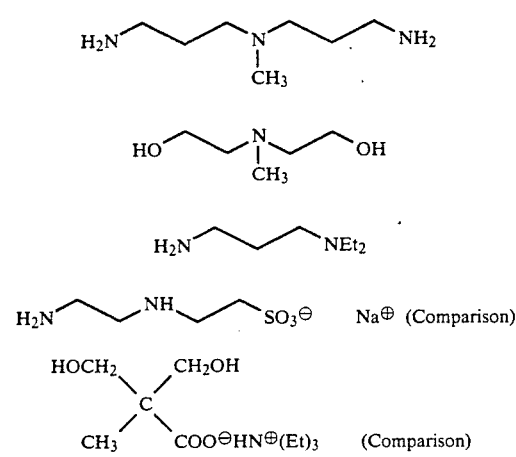

DESCRIPTION OF THE ORGANOSILANES (D)

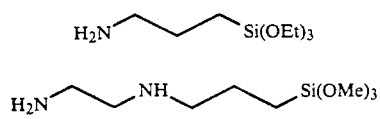

DESCRIPTION OF THE HYDROPHILIC POLYETHER ALCOHOL (E)

A polyether started on butanol and prepared with a mixture of
63.5 mole-% of ethylene oxide units and
36.5 mole-% of propylene oxide units.
OH number approx. 25

DESCRIPTION OF THE ACIDS

No. 1: Acetic acid
No. 2: Dibutylphosphate
No. 3: Lactic acid
No. 4: 1M hydrochloric acid Examples 16, 17, 18, 20, 21 and 22 are Comparison Examples as may be seen from the pH values, which lie outside the range according to the invention. The dispersions according to Examples 21 and 22 are anionically modified and in this respect also not according to the invention. All the dispersions of the Comparison Examples have a storage stability of less than one day at room temperature, which is totally inadequate. The dispersions according to the invention described in the Embodiment Examples are storage-stable products which dry to form high quality, cross-linked coatings.

EXAMPLE 23 (USE)

The dispersion according to Example 13 was spread coated on a glass plate and left to dry at room temperature for 24 hours. A hard but elastic and scratch-resistant film with very high resistance to water, dilute acetic acid, acetone, toluene and ethanol was obtained. The drying time was reduced to 30 minutes by stoving at 120° C. The film then obtained had the same advantageous properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A aqueous solution or dispersion having improved storage stability and a pH value of 3 to 6 of a cationically modified polyurethane which dries to form a cross-linked coating, said polyurethane comprising
   (i) about 2 to 200 milliequivalents of incorporated ammonium groups per 100 g of solids content,
   (ii) 0 to about 25% by weight of ethylene oxide units contained within lateral or terminal polyether chains and
   (iii) at least 1.3% by weight, calculated as $SiO_3$, of incorporated structural units corresponding to the formula

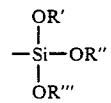

wherein R', R" and R''' may be the same or different and represent hydrogen or an alkyl group with 1 to 4 carbon atoms,
the hydrophilic structural units (i) and (ii) being present in a quantity sufficient to ensure the solubility or dispersibility of said polyurethane in water.

2. A process for the production of a coated substrate which comprises coating said substrate with a coating composition comprising the solution or dispersion of claim 1 and subsequently curing said coating.

* * * * *